United States Patent
Burrows

(10) Patent No.: US 7,103,648 B1
(45) Date of Patent: Sep. 5, 2006

(54) METHOD AND SYSTEM FOR ASSIGNING AN IP ADDRESS TO A HOST BASED ON FEATURES OF THE HOST

(75) Inventor: Erik G. Burrows, Foothill Ranch, CA (US)

(73) Assignee: Gateway Inc., Irvine, CA (US)

( * ) Notice: Subject to any disclaimer, the term of this patent is extended or adjusted under 35 U.S.C. 154(b) by 628 days.

(21) Appl. No.: 09/994,353

(22) Filed: Nov. 26, 2001

Related U.S. Application Data

(63) Continuation-in-part of application No. 09/919,556, filed on Jul. 31, 2001, now abandoned.

(51) Int. Cl.
G06F 15/177 (2006.01)

(52) U.S. Cl. ............... 709/220; 709/222; 709/226; 709/229

(58) Field of Classification Search ........ 709/220–222, 709/225–229; 710/4
See application file for complete search history.

(56) References Cited

U.S. PATENT DOCUMENTS

| | | | |
|---|---|---|---|
| 5,826,000 A | 10/1998 | Hamilton | |
| 5,974,453 A | 10/1999 | Andersen et al. | |
| 6,006,272 A | 12/1999 | Aravamudan et al. | |
| 6,009,103 A | 12/1999 | Woundy | |
| 6,049,826 A | 4/2000 | Beser | |
| 6,073,178 A | 6/2000 | Wong et al. | |
| 6,101,499 A | 8/2000 | Ford et al. | |
| 6,131,119 A | 10/2000 | Fukui | |
| 6,289,378 B1* | 9/2001 | Meyer et al. | 709/223 |
| 6,496,511 B1* | 12/2002 | Wang et al. | 370/401 |
| 2002/0065878 A1* | 5/2002 | Paxhia et al. | 709/203 |
| 2002/0129142 A1* | 9/2002 | Favier et al. | 709/225 |
| 2003/0028650 A1* | 2/2003 | Chen et al. | 709/229 |
| 2003/0195954 A1* | 10/2003 | Bahlmann | 709/222 |
| 2003/0222902 A1* | 12/2003 | Chupin et al. | 345/738 |

FOREIGN PATENT DOCUMENTS

WO  WO 9826548  * 6/1998

OTHER PUBLICATIONS

HCP Options and BOOTP Vendor Extensions; http://www.dhcp.org/rfc2132.html; Jan. 24.
Dynamic Configuration Protocol for IPv6 (DHCPv6) draft-ietf-dhc-dhcpv6-16.6xt; ftp://ftp.eg.bucknell.edu/pub/draft-ieft-dhc-dhcpv6-16.txt; Jan. 24, 2001.
Dynamic Host Configuration Protocol; http://info.internet.isi.edu/in-notes/rfc/files/rfc2131.txt; Jan. 13, 2001.

* cited by examiner

*Primary Examiner*—Kim Huynh
*Assistant Examiner*—Eron J. Sorrell
(74) *Attorney, Agent, or Firm*—Jeffrey A. Proehl; Woods Fuller Shultz & Smith PC

(57) ABSTRACT

The present invention assigns appropriate IP addresses to hosts in a local network depending upon the desired features for each host. A list of hosts in the network along with features available for each host may be generated, for example, by a graphical user interface displayed to a user. The user may select a desired feature for a specific host in the network. The selected feature may be analyzed to determine if it requires a static IP address for the host, and if required, a static IP address may be assigned to the host. If the specified feature requiring the static IP address is subsequently disabled, the static IP address may be returned to a pool of available IP addresses, and a dynamic IP address may be assigned to the host. The IP addresses are preferably assigned to the host in accordance with the Dynamic Host Configuration Protocol.

32 Claims, 4 Drawing Sheets

METHOD AND SYSTEM FOR ASSIGNING AN IP ADDRESS TO A HOST BASED ON FEATURES OF THE HOST

CROSS-REFERENCE TO RELATED APPLICATIONS

The present application is a continuation-in-part of U.S. application Ser. No. 09/919,556 filed Jul. 31, 2001 now abandoned.

FIELD OF THE INVENTION

The present invention relates generally to the assignment of IP addresses for hosts on a local area network, and more specifically to a method of assigning an IP address for a host on a local area network based upon desired operational features of the host.

BACKGROUND OF THE INVENTION

Office and home local area networks are becoming extremely popular. Local networks may provide a system for sharing available resources and transferring data among devices within the network. An example of a protocol for local networks is the Dynamic Host Configuration Protocol (DHCP). An advantage of DHCP is that a DHCP server automatically assigns an Internet Protocol (IP) address to each DHCP client or host on a local area network. Such automatic assignment of IP addresses allows easier use by consumers because it does not require any user interaction. As a result, the DHCP server is typically always enabled on small office or home local area networks.

However, several advanced consumer features require that a user identify a specific host and assign a static IP address to the host. For example, blocking of Internet access from a host or designation of a demilitarized zone (DMZ) host in a local area network may require a fixed IP address. For networks in which the DHCP server is always enabled, the user is not allowed to assign fixed or static IP addresses to hosts as required. Further, even if the user has the ability to assign fixed IP addresses to hosts, it is difficult for consumers, especially users of a home network, to determine whether a host has a specific feature which requires a static IP address and then to manually obtain and assign a static IP address to such a host.

Consequently, it would be advantageous if there were a method and a system that assigned appropriate IP addresses to hosts on a local area network depending upon the features of the hosts desired by the user. It would also be advantageous if there were a method and a system that provided a list of hosts in a local area network and the features of each host to a user, allowed the user to select the features desired for each host, determined if a static IP address was required for each host based upon the user's selections, and assigned a static IP address to each host if required.

SUMMARY OF THE INVENTION

Accordingly, the present invention is directed to a method and a system for assigning appropriate IP addresses to hosts in a local area network depending upon the user's desired features for the hosts in the network. A list of hosts in the network may be generated along with possible features for each host in the network. A user may be capable of selecting a specific feature to be performed by a specific host in the local network. The selected feature may be analyzed to determine if it requires a static IP address to be assigned to the host, and if required, a static IP address may be assigned to the host. If the specified feature requiring the static IP address is subsequently disabled, the static IP address may be returned to a pool of available IP addresses, and a dynamic IP address may then be assigned to the host.

It is to be understood that both the foregoing general description and the following detailed description are exemplary and explanatory only and are not restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made to presently preferred embodiments of the invention, examples of which are illustrated in the accompanying drawings.

Figure 1:
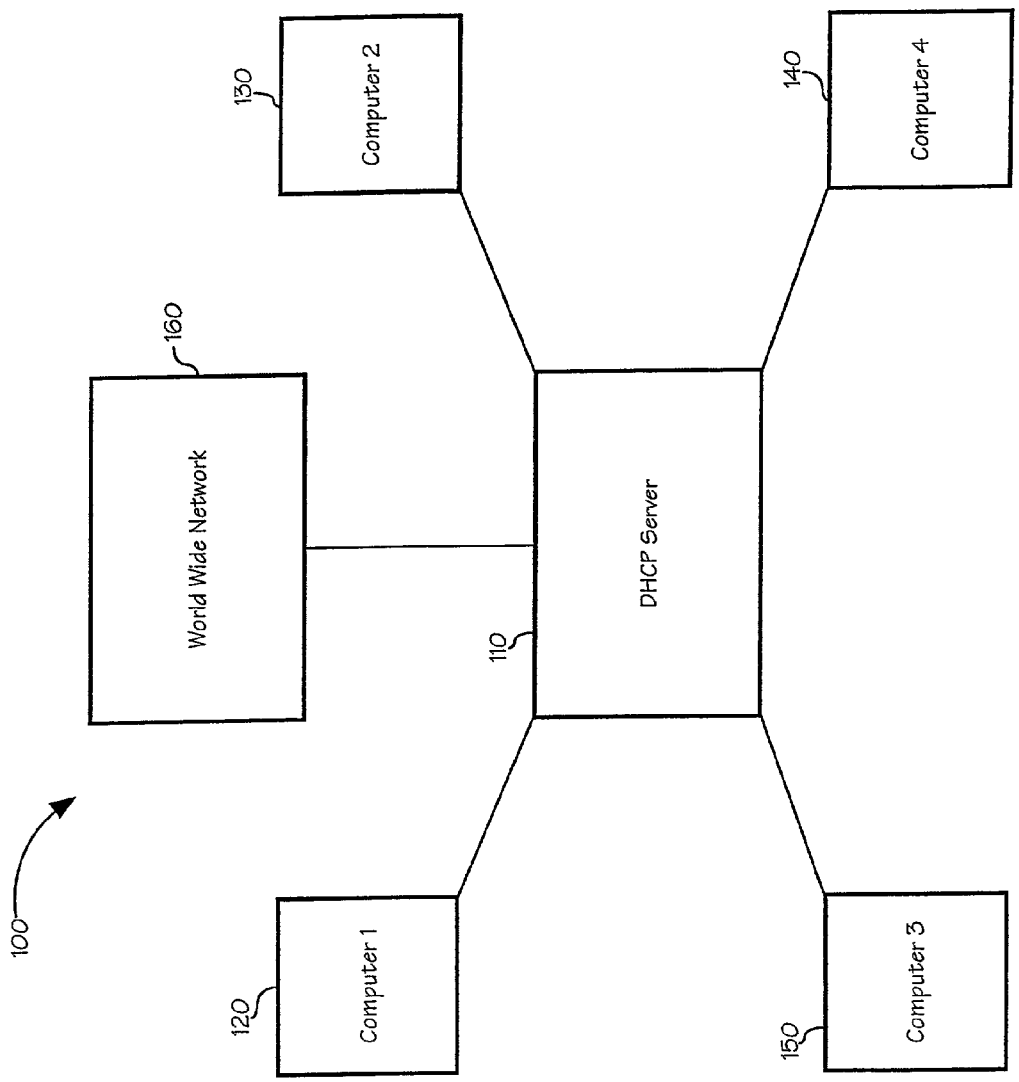
FIG. 1 depicts an exemplary embodiment of a local area network of the present invention.

Referring to FIG. 1, an exemplary embodiment of a local area network 100 is shown. The network 100 may utilize the Dynamic Host Configuration Protocol (DHCP), which allows the network 100 to automatically assign a temporary Internet Protocol (IP) address to a host when the host connects to the network 100. The network 100 may include personal computers, information appliances, network devices, and the like that are interconnected to allow sharing of resources and transfer of data.

As shown in the embodiment of FIG. 1, the network 100 may include a DHCP server 110 and four DHCP clients or computers 120–150. Each computer 120–150 may be capable of accessing a world wide network 160, such as the Internet, through the DHCP server 110. It should be appreciated by those skilled in the art that the embodiment in FIG. 1 is for illustrative purposes only and that the network 100 may include any number of computers or other devices (e.g., information appliances, network devices, peripherals, and the like) and that the computers or other devices may access the world wide network 160 through the DHCP server 110 or another server or connection (not shown).

A feature of DHCP is that it automatically assigns a dynamic IP address to each host 120–150 connected to the network 100; thus, user interaction is not required. However, if the user desires an advanced consumer feature for one or more of the hosts 120–150 on the network 100, then a static IP address may be required for the hosts 120–150. In accordance with an aspect of the present invention, an agent allows the user to select the desired features for each host 120–150 on the network 100, and then based upon the user's selected features, determines if a static IP address is required for the desired features on the host 120–150, and if required, assigns a static IP address to the host 120–150. The agent may be implemented on the network 100, the DHCP server, and/or one or more of the hosts or DHCP clients 120–150.

Figure 2:
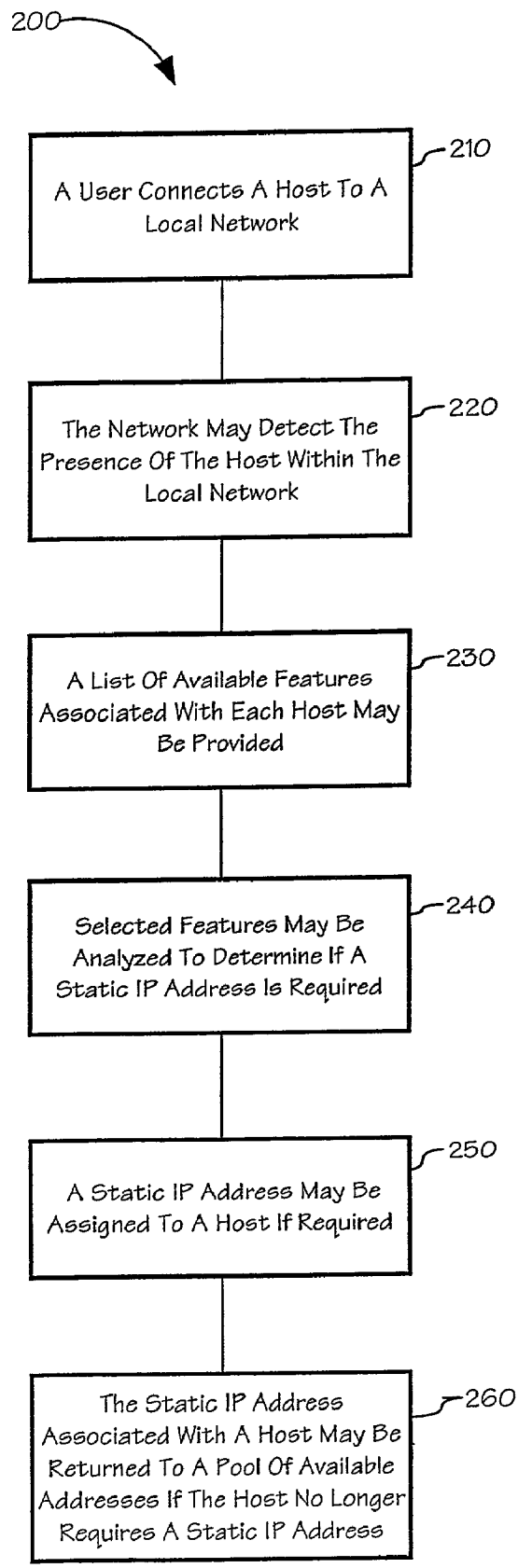
FIG. 2 depicts an exemplary embodiment of a method for assigning an IP address to a host based on features of the host in accordance with the present invention.

Referring now to FIG. 2, an exemplary embodiment of a method for assigning an IP address to a host based upon features of the host 200 in accordance with the present invention is shown. An advantage of the present invention is that no user intervention is necessary to provide static IP addresses to hosts on the network when desired features for the hosts require static IP addresses. As described above, the agent determines if a static IP address is required for the desired features on the host, and if required, assigns a static IP address to the host.

Beginning at step 210, a user connects a host to the local area network, for example, by plugging a computer or other device between a cable modem and the local area network hub. In step 220, the local area network detects the presence of the additional host within the network. Generally, a dynamic IP address will be assigned to the host unless the host has a feature enabled which specifically requires a static IP address. In step 230, a list of available features associated with each of the hosts connected to the network may be provided to the user. For example, a list of available features may include blocking Internet access from the host and designating the host as a demilitarized zone (DMZ) host or other type of protected host (e.g., e-mail, World Wide Web, or the like server). If the user desires one or more of these features, the user may activate them, for example, by selecting the feature on a displayed graphical user interface. In an alternative embodiment, a desired feature may be activated automatically when the host is connected to the network.

Next in step 240, the desired features for the host selected by the user are analyzed to determine whether the desired features require a static IP address. In step 250, if the desired features require a static IP address, a static IP address is assigned to the host; otherwise, a dynamic IP address is assigned to the host. The static or dynamic IP address may be assigned to the host in accordance with known DHCP methods. For example, to assign a dynamic IP address to a host, the host or DHCP client may request a dynamic IP address from the DHCP server, and the DHCP server may then assign a dynamic IP address to the host or DHCP client. DHCP also provides a mechanism for assigning a static IP address to a host. For example, the host or DHCP client may request from the DHCP server an "infinite" lease for an IP address. Alternatively, the DHCP server may store in a file or non-volatile memory which hosts or DHCP clients require static IP addresses and then continually reassign the same IP address to those hosts. Further, separate pools of available dynamic IP addresses and static IP addresses may be maintained, and dynamic and static IP addresses may be respectively assigned from these pools. Alternatively, a single pool of available IP addresses may be maintained, and both dynamic and static IP addresses may be assigned from this single pool.

In one embodiment, when a host is first identified as requiring a static IP address, the host's name may be resolved to a Media Access Control (MAC) address, such as a fixed Ethernet or Home Phone Networking Association (HPNA) address, and used thereafter. In this way, an unauthorized user cannot bypass a feature by changing the host's name. The MAC address may be used to configure the advanced feature requiring the static IP address and any subsequent feature requiring a static IP address.

Continuing in step 260, if the desired feature requiring the static IP address for the host is subsequently disabled, and the host no longer has any features requiring the static LP address, the static IP address assigned to the host may be returned to the pool of available IP addresses. A dynamic IP address may then be assigned to the host in accordance with known DHCP methods.

As one example of the above-described method 200, the user may connect a host to the local area network, and the network may detect the presence of the newly connected host. The user may be presented with a list of available features for the host, and the user may choose to activate the feature of blocking Internet access from the host. Such feature may be determined to require a static IP address, and as a result, a static IP address may be assigned to the host in order to ensure blockage of Internet access to the host. If the user subsequently disables this Internet access blockage feature for the host, and the host no longer requires its static IP address, the static IP address is returned to the pool of available IP addresses, and a dynamic IP address may then be assigned to the host.

Figure 3:
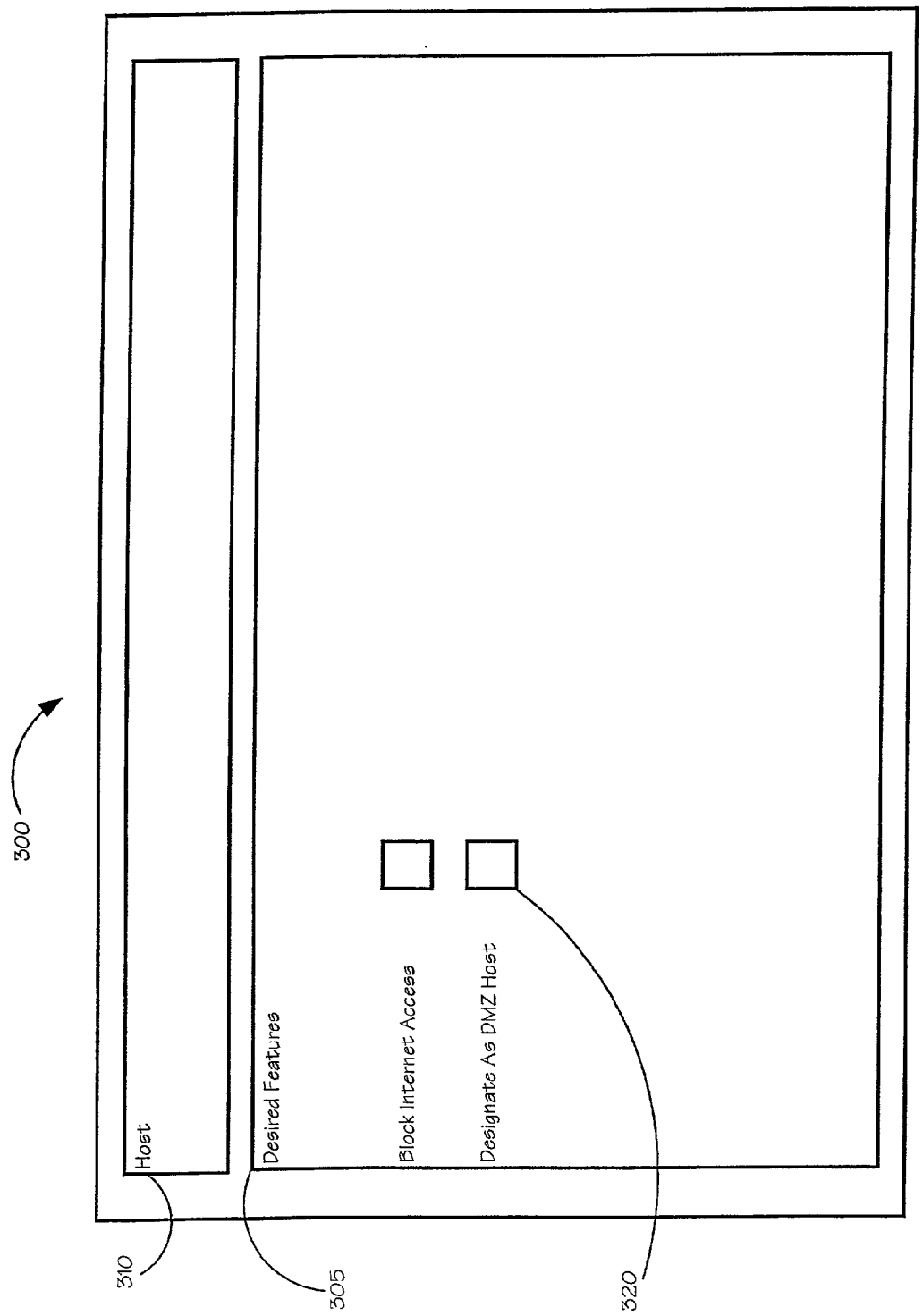
FIG. 3 depicts an exemplary embodiment of a graphical user interface of the present invention.

Referring now to FIG. 3, an embodiment of a graphical user interface 300 suitable for allowing a user to select the features for a host in accordance with the present invention is shown. When a host is installed on the local area network, the user may access a configuration page that shows the hosts connected to the network. For example, for the embodiment shown in FIG. 1, one icon representing the DHCP server 110, as well as four icons representing the four computers or DHCP clients 120–150 connected to the network 100, may be displayed.

If the icon representing a host 120–150 is selected, a graphical user interface 300 may be displayed corresponding to the selected host 120–150. In the embodiment illustrated in FIG. 3, the graphical user interface 300 may provide a list of available features 305 associated with the host 310, including features which require and do not require a static IP address for the host 310. Upon selection of different features 305 by the user, the agent may determine whether one or more of the selected features 305 require a static IP address for the host 310, and if required, assign a static IP address to the host 310. For example, the agent may maintain a table including available features 305 for each host 310 and a corresponding entry for each feature 305 indicating whether such feature 305 requires or does not require a static IP address. For example, if the user desires that the host 310 act as a DMZ host, then the user may select the box associated with that feature 320. The agent may determine that the host 310 now requires a static IP address to operate correctly as the DMZ host, and thus, assign a static IP address to the host 310, in accordance with the method for assigning an IP address to a host based upon features of the host 200 described above with reference to FIG. 2.

Figure 4:
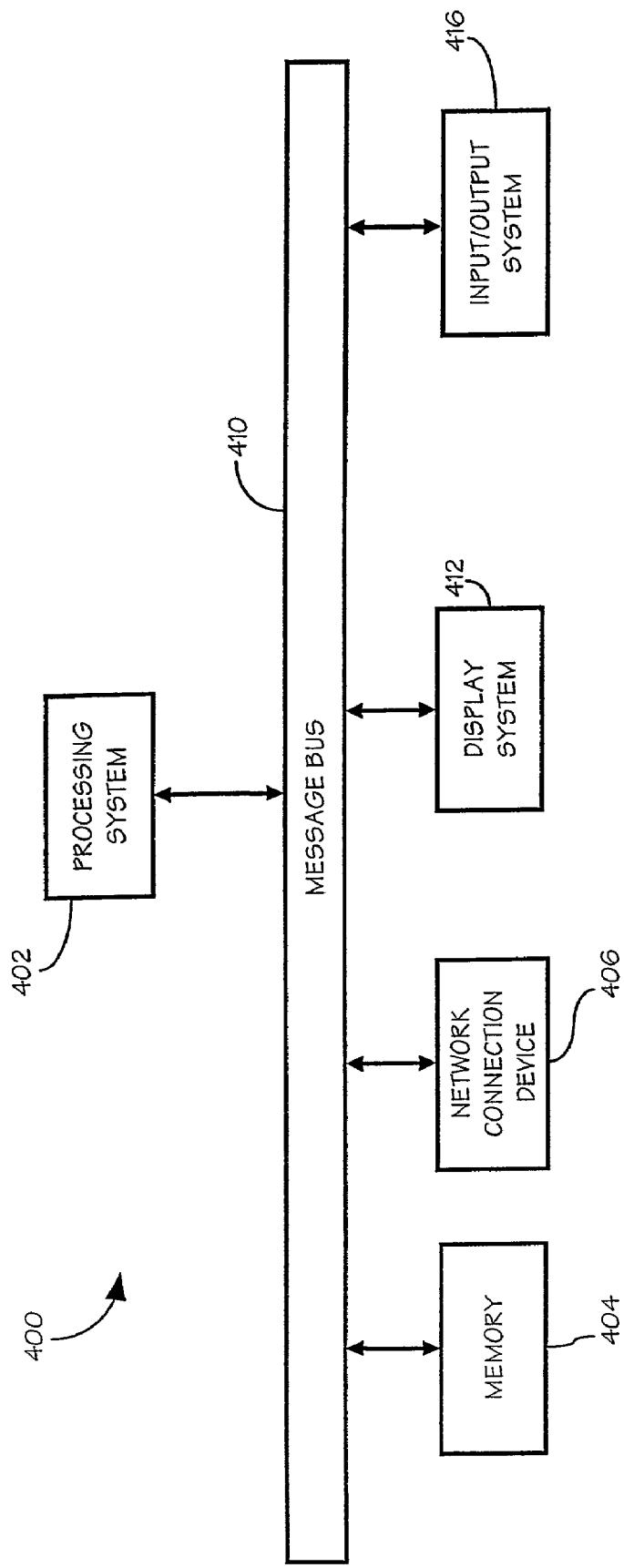
FIG. 4 is a block diagram of an information handling system in accordance with an embodiment of the present invention.

Referring now to FIG. 4, a representative hardware architecture of an information handling system 400 in accordance with the present invention is shown. The information handling system 400 may be in the form of a computer 120–150 or a DHCP server 110 shown in FIG. 1. Further, the information handling system 400 may be capable of executing a set of instructions or software to assign a static IP address to a host if desired operational features of the host require a static IP address.

A processing system 402, such as a controller, controls the information handling system 400. The processing system 402 includes a central processing unit such as a microprocessor or microcontroller for executing programs, performing data manipulations, and controlling the tasks of the information handling system 400. Communication with the processing system 402 may be implemented through a message or system bus 410 for transferring information among the devices of the information handling system 400. The system bus 410 may include a data channel for facilitating information transfer between storage and other peripheral devices of the information handling system 400. The system bus 410 further provides the set of signals required for communication with the processing system 402, including a data bus, address bus, and control bus. The system bus 410 may comprise any state of the art bus architecture according to promulgated standards, for example, industry standard architecture (ISA), extended industry standard architecture (EISA), Micro Channel Architecture (MCA), peripheral device interconnect (PCI) local bus, standards promulgated by the Institute of Electrical and Electronics Engineers (IEEE) including IEEE 488 general-purpose interface bus (GPIB), IEEE 696/S-600, and the like. Furthermore, the system bus 410 may be compliant with any promulgated industry standard bus architectures, for example, Industry Standard Architecture (ISA), Extended Industry Standard Architecture (EISA), Micro Channel Architecture (MCA), Peripheral Device Interconnect (PCI), Universal Serial Bus (USB), Access bus, IEEE P6394, Apple Desktop Bus (ADB), Concentration Highway Interface (CHI), Fire Wire, Geo Port, or Small Computer Systems Interface (SCSI).

Additionally, the information handling system 400 includes a memory 404. In one embodiment, the memory 404 is provided on SIMMs (Single In-line Memory Modules), while in another embodiment, the memory 404 is provided on DIMMs (Dual In-line Memory Modules), each of which plugs into suitable sockets provided on a motherboard holding many of the other devices shown in FIG. 4. The memory 404 includes standard DRAM (Dynamic Random-Access Memory), EDO (Extended Data Out) DRAM, SDRAM (Synchronous DRAM), or other suitable memory technology. The memory 404 may also include auxiliary memory to provide storage of instructions and data that are loaded into the memory 404 before execution. Auxiliary memory may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM).

The information handling system 400 may also include a network connection device or network interface 406. The network interface 406 communicates between the information handling system 400 and a remote device, such as external devices, networks, information sources, or host systems that administer a plurality of information appliances. For example, host systems, such as a server or information handling system, may run software controlling the information handling system 400, serve as storage for the information handling system 400, or coordinate software running separately on each information handling system 400. The network interface 406 may provide or receive analog, digital, or radio frequency data. The network interface 406 preferably implements industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.66 for wireless networks, and the like), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and Universal Serial Bus (USB). For example, the network interface system 406 may comprise a network adapter, a serial port, parallel port, printer adapter, modem, universal asynchronous receiver-transmitter (UART) port, or the like, or use various wireless technologies or links such as an infrared port, radio-frequency (RF) communications adapter, infrared transducers, or RF modem.

The information handling system 400 may further include a display system 412, which may allow for generation of a display when the information handling system 400 is connected to a display device. The display system 412 may comprise a video display adapter having all of the devices for driving the display device, including video random access memory (VRAM), buffer, and graphics engine as desired. A display device may comprise a liquid-crystal display (LCD), or may comprise alternative display technologies, such as a light-emitting diode (LED) display, gas or plasma display, or employ flat-screen technology.

The information handling system 400 may also include an input/output (I/O) system 416, which may allow for user input via I/O devices when I/O devices are connected to the information handling system 400. The input/output system 416 may comprise one or more controllers or adapters for providing interface functions between one or more I/O devices. For example, the input/output system 416 may comprise a serial port, parallel port, network adapter, printer adapter, radio-frequency (RF) communications adapter, universal asynchronous receiver-transmitter (UART) port, and the like, for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, or the like. It should be appreciated that modification or reconfiguration of the information handling system 400 shown in FIG. 4 by a person of ordinary skill in the art would not depart from the scope or the spirit of the present invention.

Although the invention has been described with a certain degree of particularity, it should be recognized that elements thereof may be altered by persons skilled in the art without departing from the spirit and scope of the invention. Embodiments of the present invention may be implemented as sets of instructions resident in the memory 404 of one or more information handling systems 400 configured generally as described in FIG. 4. Until required by the information handling system 400, the set of instructions may be stored in another readable memory device, for example, in a hard disk drive or in a removable memory, such as an optical disc for utilization in a CD-ROM drive, a floppy disk for utilization in a floppy disk drive, a floppy/optical disc for utilization in a floppy/optical drive, or a personal computer memory card for utilization in a personal computer card slot. Further, the set of instructions may be stored in the memory 404 of an information handling system 400 and transmitted over a local area network or a wide area network, such as the Internet, when desired by the user. One skilled in the art would appreciate that the storage of the set of instructions physically changes the medium upon which it is stored electrically, magnetically, chemically, physically, optically or holographically so that the medium carries computer readable information.

In exemplary embodiments, the method disclosed may be implemented as a set of instructions or software readable by a device. Further, it is understood that the specific order or hierarchy of steps in the method disclosed is an exemplary approach. Based upon design preferences, it is understood that the specific order or hierarchy of steps in the method may be rearranged while remaining within the scope of the present invention. The accompanying method claims present elements of the various steps in a sample order, and are not meant to be limited to the specific order or hierarchy presented.

It is believed that the method and system for the present invention and many of its attendant advantages will be understood by the foregoing description, and it will be apparent that various changes may be made in the form, construction, and arrangement of the components thereof without departing from the scope and spirit of the invention or without sacrificing all of its material advantages, the form herein before described being merely explanatory embodiments thereof. It is the intention of the following claims to encompass and include such changes.

What is claimed is:

1. A method for assigning Internet Protocol (IP) addresses, comprising:
   identifying hosts present within a local network;
   providing a list of available features for at least one host within said local network;
   receiving a selection of one of said available features from said list;
   a analyzing by an agent if said selected feature requires a static IP address to be assigned to said at least one host; and
   assigning an IP address to said at least one host by said agent, wherein a static IP address is assigned to said at least one host if said selected feature requires said static IP address.

2. The method as claimed in claim 1, wherein a dynamic IP address is assigned to said at least one host if said selected feature does not require said static IP address to be assigned to said at least one host.

3. The method as claimed in claim 2, wherein said static IP address is assigned from a pool of available static IP addresses and said dynamic IP address is assigned from a pool of available dynamic addresses.

4. The method as claimed in claim 1, wherein said list is provided in a graphical user interface.

5. The method as claimed in claim 4, wherein said selected feature is capable of being selected by a user utilizing said graphical user interface.

6. The method as claimed in claim 1, wherein said assigning of said IP address is in accordance with Dynamic Host Configuration Protocol.

7. The method as claimed in claim 1, further comprising, returning said static IP address to a pool of available IP addresses if said selected feature requiring said static IP address is disabled.

8. A computer readable storage medium having a program of instructions stored thereon, that when executed cause an information handling system to execute steps for assigning Internet Protocol (IP) addresses, the steps comprising:
   identifying hosts present within a local network; providing a list of available features for at least one host within said local network;
   receiving a selection of one of said available features from said list;
   analyzing if said selected feature requires a static IP address to be assigned to said at least one host; and
   assigning an IP address to said at least one host, wherein a static IP address is assigned to said at least one host if said selected feature requires said static IP address.

9. The computer readable storage medium as claimed in claim 8, wherein a dynamic IP address is assigned to said at least one host if selected feature does not require said static IP address to be assigned to said at least one host.

10. The computer readable storage medium as claimed in claim 9, wherein said static IP address is assigned from a pool of available static IP addresses and said dynamic IP address is assigned from a pool of available dynamic addresses.

11. The computer readable storage medium as claimed in claim 8, wherein said list is provided in a graphical user interface.

12. The computer readable storage medium as claimed in claim 11, wherein said selected feature is capable of being selected by a user utilizing said graphical user interface.

13. The computer readable storage medium as claimed in claim 8, wherein said assigning of said IP address is in accordance with Dynamic Host Configuration Protocol.

14. The computer readable storage medium as claimed in claim 8, further comprising: returning said static IP address to a pool of available IP addresses if said selected feature requiring said static IP address is disabled.

15. In a local network of one or more one hosts, a system for assigning Internet Protocol (IP) addresses, comprising:
   means for identifying the hosts present within the local network;
   means for providing a list of available features for at least one host within the local network;
   means for receiving a selection of one of said available features from said list;
   means for analyzing if said selected feature requires a static IP address to be assigned to said at least one host; and
   means for assigning an IP address to said at least one host, wherein a static IP address is assigned to said at least one host if said selected feature requires said static IP address.

16. The system as claimed in claim 15, wherein a dynamic IP address is assigned to said at least one host if said selected feature does not require said static IP address to be assigned to said at least one host.

17. The system as claimed in claim 16, wherein said static IP address is assigned from a pool of available static IP addresses and said dynamic IP address is assigned from a pool of available dynamic addresses.

18. The system as claimed in claim 15, wherein said list is provided in a graphical user interface.

19. The system as claimed in claim 18, wherein said selected feature is capable of being selected by a user utilizing said graphical user interface.

20. The system as claimed in claim 15, wherein said assigning means operates in accordance with Dynamic Host Configuration Protocol.

21. The system as claimed in claim 15, further comprising: means for returning said static IP address to a pool of available addresses if said selected feature requiring said static IP address is disabled.

22. In a local network of one or more hosts, a system for assigning Internet Protocol (IP) addresses, comprising:
   a processor;

a memory coupled to said processor, wherein said memory stores a list of available features for at least one host within the local network;

a display coupled to said processor, wherein said display provides said list of available features to a user;

an input device coupled to said processor, wherein said input device receives a selection by said user of one of said available features from said list;

logic executed by the processor, wherein said logic identifies hosts present within a local network, analyzing if said feature selected by said user requires a static IP address to be assigned to said at least one host, and assigning an IP address to said at least one host, wherein a static IP address is assigned to said at least one host if said selected feature requires said static IP address.

23. The system as claimed in claim 22, wherein a dynamic IP address is assigned to said at least one host if said selected feature does not require said static IP address to be assigned to said at least one host.

24. The system as claimed in claim 23, wherein said static IP address is assigned from a pool of available static IP addresses and said dynamic IP address is assigned from a pool of available dynamic addresses.

25. The system as claimed in claim 22, wherein said list is provided in a graphical user interface on said display.

26. The system as claimed in claim 25, wherein said selected feature is capable of being selected by said user utilizing said graphical user interface.

27. The system as claimed in claim 22, wherein said IF address is assigned in accordance with Dynamic Host Configuration Protocol.

28. The system as claimed in claim 22, said logic is further capable of returning said static IP address to a pool of available addresses of said selected feature requiring said static IP address is disabled.

29. The system of claim 1 wherein said analyzing if said selected feature requires a static IP address is performed automatically.

30. The system of claim 1 wherein said analyzing if said selected feature requires a static IP address is performed without user intervention.

31. The system of claim 1 wherein said list of available features includes blocking access to the Internet from said at least one host.

32. The system of claim 1 wherein said list of available features includes designating said at least one host as a demilitarized zone (DMZ) host.

* * * * *